United States Patent
Bauer et al.

(10) Patent No.: US 7,866,976 B2
(45) Date of Patent: Jan. 11, 2011

(54) MOLD CLAMPING MECHANISM OF AN INJECTION MOLDING MACHINE

(75) Inventors: Michael Bauer, Linz (AT); Thomas Eizenberger, Linz (AT)

(73) Assignee: Engel Austria GmbH, Schwertberg (AT)

( * ) Notice: Subject to any disclaimer, the term of this patent is extended or adjusted under 35 U.S.C. 154(b) by 498 days.

(21) Appl. No.: 11/855,213

(22) Filed: Sep. 14, 2007

(65) Prior Publication Data

US 2008/0078261 A1 Apr. 3, 2008

(30) Foreign Application Priority Data

Sep. 18, 2006 (AT) .............................. A 1557/2006

(51) Int. Cl.
*B29C 45/66* (2006.01)
(52) U.S. Cl. .................. 425/593; 425/472; 425/451.6
(58) Field of Classification Search .............. 425/592, 425/593, 595, 451.6, 451.9, 472
See application file for complete search history.

(56) References Cited

U.S. PATENT DOCUMENTS 5,123,834 A * 6/1992 Joyner .................... 425/593
6,027,329 A * 2/2000 Nazarian et al. ......... 425/451.9
6,595,766 B2 * 7/2003 Nakamoto ................ 425/593
6,776,605 B2 * 8/2004 Becker et al. ............ 425/595
7,048,535 B2 * 5/2006 Takanohashi ............ 425/593
7,080,978 B2 * 7/2006 Glaesener ................ 425/595
7,607,912 B2 * 10/2009 Tognon et al. ........... 425/593

FOREIGN PATENT DOCUMENTS

| AT | 412855 B | 8/2005 |
|---|---|---|
| DE | 20200501413 U | 11/2005 |
| JP | 09099339 A | 4/1996 |
| JP | 08230003 A | 9/1996 |

\* cited by examiner

*Primary Examiner*—James Mackey
(74) *Attorney, Agent, or Firm*—Notaro, Michalos & Zaccaria P.C.

(57) ABSTRACT

Mold clamping mechanism of an injection molding machine with a movable platen (10), a fixed platen (12) and a support section (9) connected to the movable platen (10) through connecting links, wherein, when clamping force is applied via the connecting links, a force is transmitted to the front face (9A) of the support section (9), wherein at least one recess (25) is arranged between the front face (9A) and the back face (9B) of the support section (9), which is formed in such a manner that those regions of the front face (9A) of the support section (9) to which the force ($F_H$) is transferred are evenly deformed when force is applied.

24 Claims, 4 Drawing Sheets

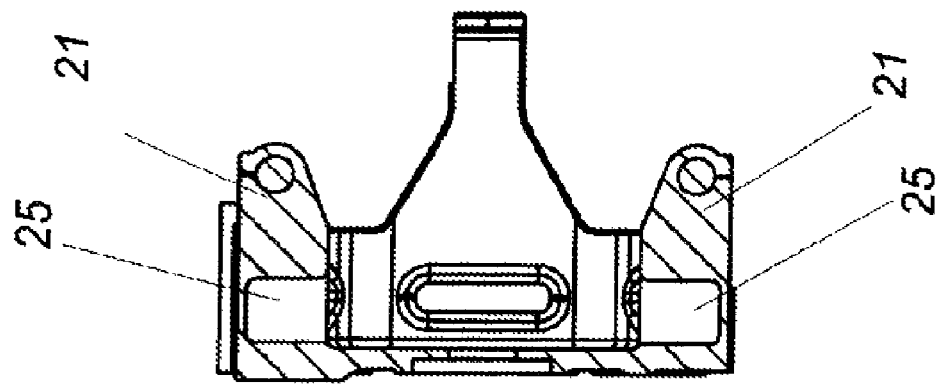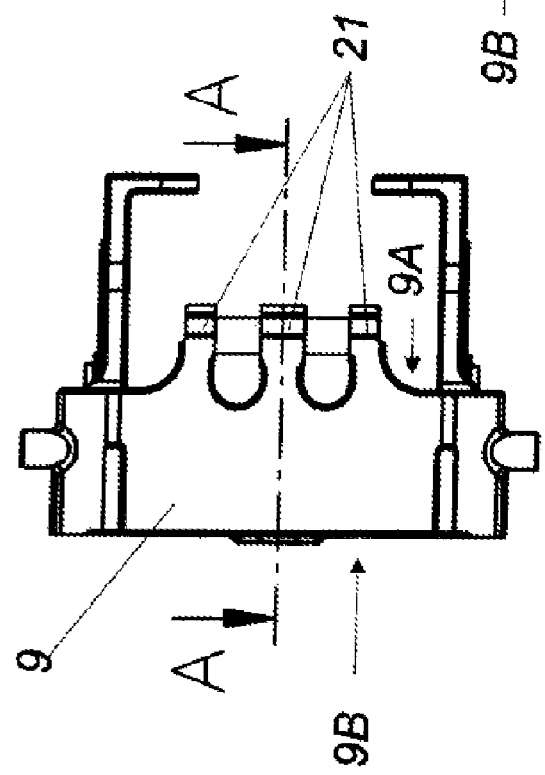

MOLD CLAMPING MECHANISM OF AN INJECTION MOLDING MACHINE

BACKGROUND OF THE INVENTION

1. Field of the Invention

The present invention relates to a mold clamping mechanism of an injection molding machine with a movable platen, a fixed platen and a support section connected to the movable platen through connecting links, wherein, when clamping force is applied via the connecting links, a force is transmitted to the front face of the support section. The invention also relates to such a support section.

2. Description of the Prior Art

The mold clamping mechanism of an injection molding machine serves to pick up the injection molding tool and perform the movements necessary for closing, clamping and opening. The forces necessary for clamping and opening are exerted by the mold clamping mechanism. Typically injection molding machines are categorized according to their clamping force, wherein the clamping force in the prior art ranges between several hundred kN and approximately 100,000 kN. Naturally a clamping force creates a corresponding reaction force, which acts on the mold clamping mechanism. In the case of lever mechanisms, for example toggle lever mechanisms, such as for example described in Austrian Patent AT 412 855, the high loading in the region of the support section leads to deformations. This causes relative displacement of the articulated joints or lever bearings. In order to keep the loading on the guide elements, as well as optionally the spars and spar adjustment threads, as low as possible in view of weight and cost reduction considerations, conventional designs result in an increase in the total height of the component and/or in a reinforcement of the support section to reduce the support section's bowing under load. This not only leads to an enlargement of the already large injection molding machine, but also to increased cost as a result of the increased material requirements.

SUMMARY OF THE INVENTION

The object of the present invention is it to provide a mold clamping mechanism of the type initially specified, wherein the described disadvantages are reduced. In particular the relative displacement of the articulated joints or lever bearings that takes place with the build up of clamping force should be decreased or prevented.

This object is achieved by the features of the independent claim. By arranging at least one recess between the front face and the back face of the support section, which is formed in such a manner that those regions of the front face of the support section to which the force ($F_H$) is transferred are evenly deformed when force is applied, not only a support section having less mass can be used, but due to a uniform lowering of the front face of the support section, even loading in all the articulated joints and lever bearings results. As an additional effect the clamping force is distributed more regularly into the mold and the injection molding tool. Preferably several recesses are provided.

In a preferred embodiment provision is made for the connecting links to be connected to the support section by articulated joints and lugs arranged on the support section, so that the force is transferred to the support section by the lugs. The support section could then be formed in such a manner that the recesses in the vicinity of those lugs, which are more heavily loaded as the clamping force builds up, are larger than the recesses in the vicinity of those lugs, which are less heavily loaded. For example, the recess could be configured in such a manner that in those regions, where in the prior art minor deformations develop, the recess is accordingly larger, so that this region experiences greater deformation, this recess being adapted accordingly to the region of maximum deformation.

In the simplest case it is proposed that recesses are only arranged in the region of those lugs which lie in the part of the front plate that is most strongly bowed under load.

While the exemplary embodiment described above is based on a lever mechanism for the connecting links, of course hydraulic connecting links, for example piston-cylinder assemblies or other connecting links can also be provided.

In the case of the presently known embodiments of the support section, the entire section acts as a centrally loaded and outwardly mounted compression rod, as a result of which the surface pressure is unevenly distributed between several lever bushes, displaced relative to one another due to the bowing of the plate, with the pins. Due to the recesses according to the invention, even deformation can be achieved.

In order to keep deformation to a minimum overall at the same time as reducing the amount of material needed, additional struts are arranged in the region of the recesses between the front and rear faces of the support section in the region of the front face of the support section that is deformed by force. The struts are arranged in such a way that in those regions where deformation is inherently large the forces are deflected in such a way that increased deformation occurs in the regions of lesser deformation, and the region that is more strongly distorted in the prior art is less heavily distorted. For this purpose it is advantageous if the struts are at an angle with the clamping force direction other than 0°, preferably at an angle of 35°-55°, particularly preferably of 45°. It has proven advantageous if the cross-sectional shape of the recesses, that is to say in section along the clamping force direction, is approximately triangular or approximately trapezoidal. In the case of the triangular shape it has proven advantageous if it can be right-angled and/or equilateral. Preferably at least three connecting links are provided. Particularly preferably several (at least three) connecting links lie along a substantially straight line.

In the simplest case the connecting links comprise a toggle lever or knuckle joint mechanism.

In addition to the mold clamping mechanism, the invention also naturally relates to the support section of such a mold clamping mechanism.

BRIEF DESCRIPTION OF THE DRAWINGS

Further details of the invention are described in detail on the basis of the following figures which show:

FIG. 6 is a cross-section of the embodiment of the invention shown in FIG. 5.

DESCRIPTION OF THE PREFERRED EMBODIMENTS

Figure 1:
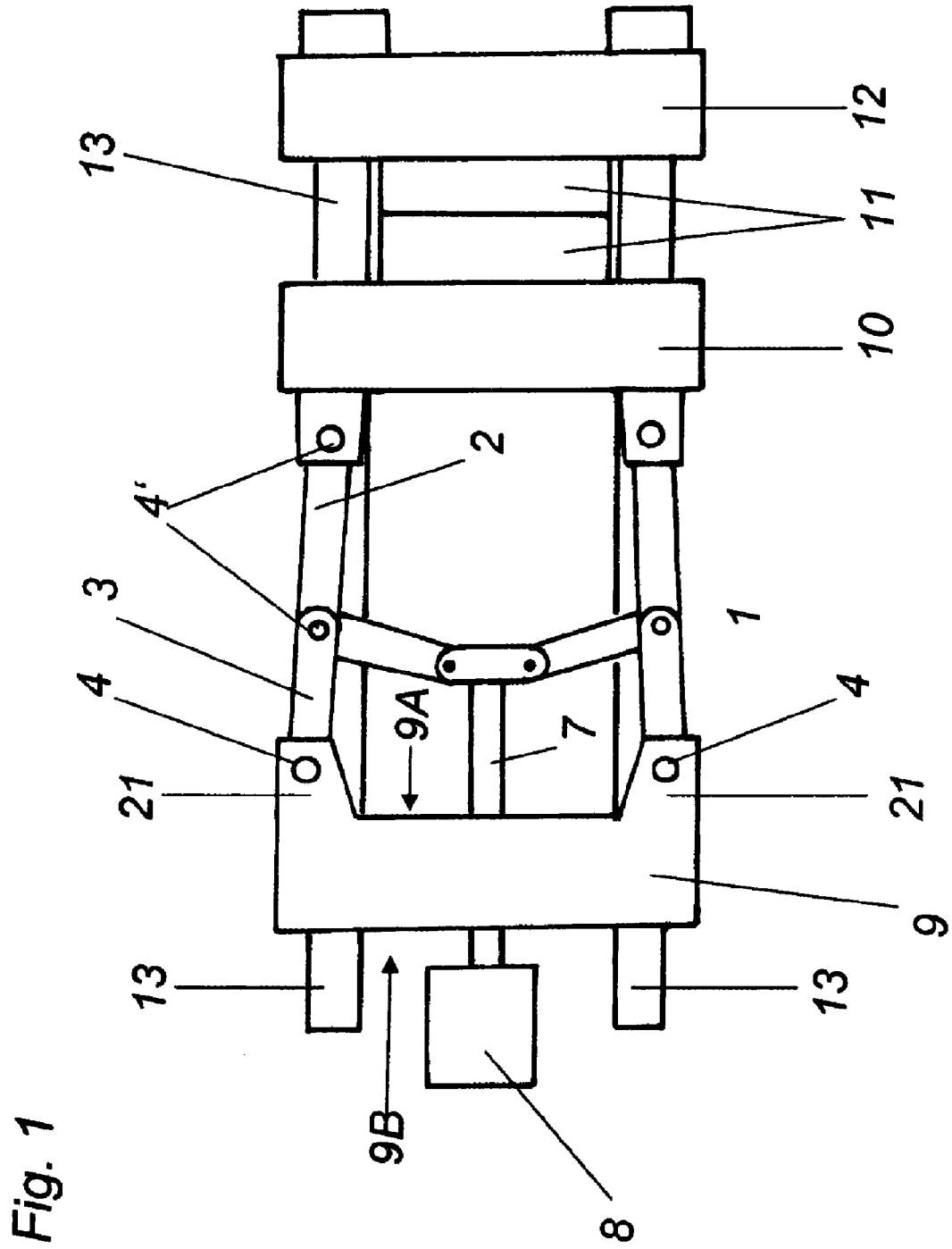
FIG. 1 a side view of a mold clamping mechanism of an injection molding machine according to an embodiment of the invention, FIG. 2 a support section according to the prior art, FIG. 3 an example of a support section in accordance with the embodiment of FIG. 1, FIG. 4 a perspective view of a support section according to the invention, and FIG. 5 a side view of another embodiment of the invention.

FIG. 1 shows an exemplary embodiment of a mold clamping mechanism of an injection molding machine, with a movable platen 10, a fixed platen 12 and a support platen or section 9. The movable platen 10 is connected to the support section 9 by a lever mechanism described in detail further below. When clamping force is applied a force opposed to the clamping force is transmitted by the lever mechanism to the front face 9A of the support section 9. Recesses 25 arranged (FIG. 3) between front face 9A and back face 9B of the support section 9 are formed in such a manner that the regions of the front face 9A of the support section 9 to which the force is transmitted are evenly deformed when force is applied. In the example shown the movable platen 10 on the front face 9A of the support section 9 is supported, when the clamping force is applied, by a toggle lever mechanism and articulated joints 4 arranged on the support section 9. The articulated joints 4 are arranged on lugs 21 on the front face 9A of the support section 9. A more detailed description of the support section 9 is provided later in connection with FIGS. 3 and 4.

In the exemplary embodiment two main levers 1 are evident which are for transporting the movable platen 10 and thus for opening and closing the injection mold, which is formed by the tool halves 11. In addition to the fixed platen 12, the illustrated mold clamping mechanism comprises the platen 10 movably mounted on the spars 13, and the support section 9 which is also fixed and which is often also called the front platen. The movable platen 10 is connected to the support section 9 by the main levers 1, which in each case have a first member 2 and a second member 3 and articulated joints 4, 4'. A linear drive is provided for moving the toggle levers 1. This has a motor 8 as well as a piston 7 which can move back and forth. The piston 7 is linked to the members 2, 3, so that the movable platen 10 is transported relative to the support section 9 by the piston 8 moving back and forth.

When the piston 7 moves, the main levers 1 are driven to and fro between the extended position illustrated and a retracted position not illustrated in FIG. 1, as a result of which the movable platen 10 and the tool half 11 attached to it are transported. Of course the lever mechanism can also be formed otherwise. In the context of the invention naturally a tool height adjustment corresponding to the prior art can also be provided.

Figure 2:
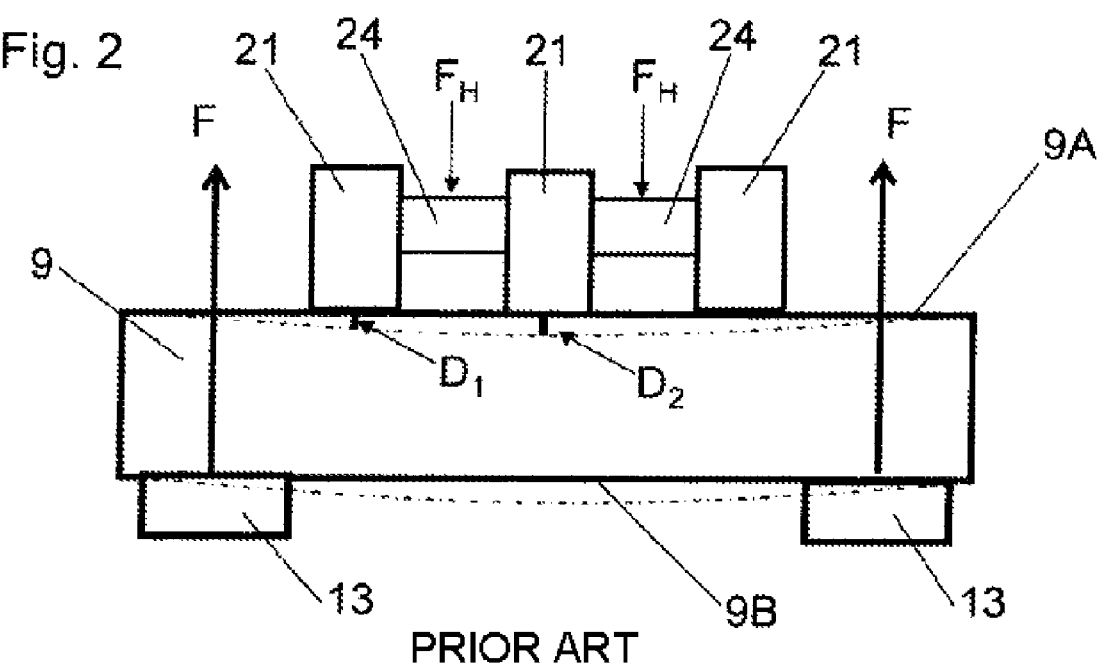

FIG. 2 shows a cross section of a support section 9 of a conventional mold clamping mechanism according to the prior art. The illustration shown, related to FIG. 1, would correspond to a view from above onto the support section 9; the cross section in the region of the lugs 21 is along the axis H. The lugs 21 in this case correspond to the connecting links in accordance with Claim 1. The deformation of the support section 9, when loaded by application of the clamping force, is clearly recognizable, namely on the front face 9A and on the back face 9b of the support section 9. The deformed state of the support section 9 in this case is drawn as a dash-dotted line. The lugs 21 to which the toggle lever mechanism is linked, and between which lever bearings 24 of the articulated joints 4 are arranged are clearly evident. With a given amount of exerted force, less bowing or deformation $D_1$ arises in the two outer lugs 21 than in the central lug 21 ($D_2$). Thus overall the support section 9 is unevenly deformed ($D_1$, $D_2$) in the region of force transmission (here corresponding to the region of the lugs 21). It is recognizable from this that in the region of the central lug 21 more deformation $D_2$ occurs than in the region of the outer lugs 21, where the deformation is $D_1$.

Figure 3:
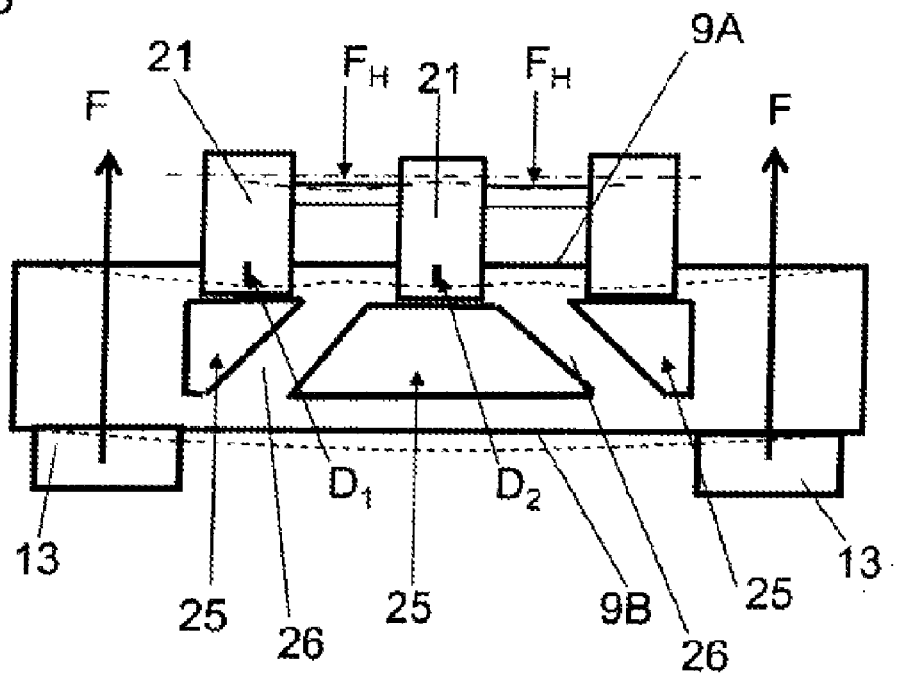

In FIG. 3 an example according to the invention of a support section 9 is now recognizable in the same view as FIG. 2, wherein this irregular deformation effect in the region of force transmission by three connecting links (lugs 21) no longer arises on the support section 9. Transverse to the force direction $F_H$ in the region of the individual articulated joints or lugs 21 uniform lowering or deformation of the support section 9, when loaded due to application of the clamping force, can be recognized. As a result of the recesses 25 between the front and back faces of the support section 9 the outer lugs 21 are pushed in to the same degree along the direction of force as the central lug 21, so that the amount of deformation $D_1$ of the outer lugs 21 and $D_2$ of the inner lug 21 is the same. Additional struts 26 increase the rigidity of the support section 9. As a result of the struts 26 a force-diversion effect is achieved outwards into the boundary region of the support section 9, as a result of which less deformation $D_2$ occurs in the center. It is recognizable that the back face 9B of the support section 9, in the exemplary embodiment shown, is deformed similarly as in the prior art. This effect is not problematic. It is important that in the region of force transmission, thus here near the lugs 21, the front face 9A of the support section 9 lowers evenly, so that the force is uniformly exerted in the direction of the injection molding tool 11. The effect whereby at least one recess 25 is arranged between the front face 9A and back face 9B of the support section 9, and is formed such that those regions of the front face 9A of the support section to which the force is transmitted are evenly deformed when force is applied, is to be understood in such a way that, although irregular deformation is possible overall, the deformation $D_1$, $D_2$ in the region of the lugs 21, or of force transmission, compared to the unloaded condition is substantially equal ($D_1$=$D_2$). As a result of the recesses and struts 26 according to the invention the deviation from $D_1$ to $D_2$ can be reduced to under 10%, better to a few percent, in the ideal case to <2%. The improved deformation of the front face 9A is drawn here as a dashed line.

Figure 4:
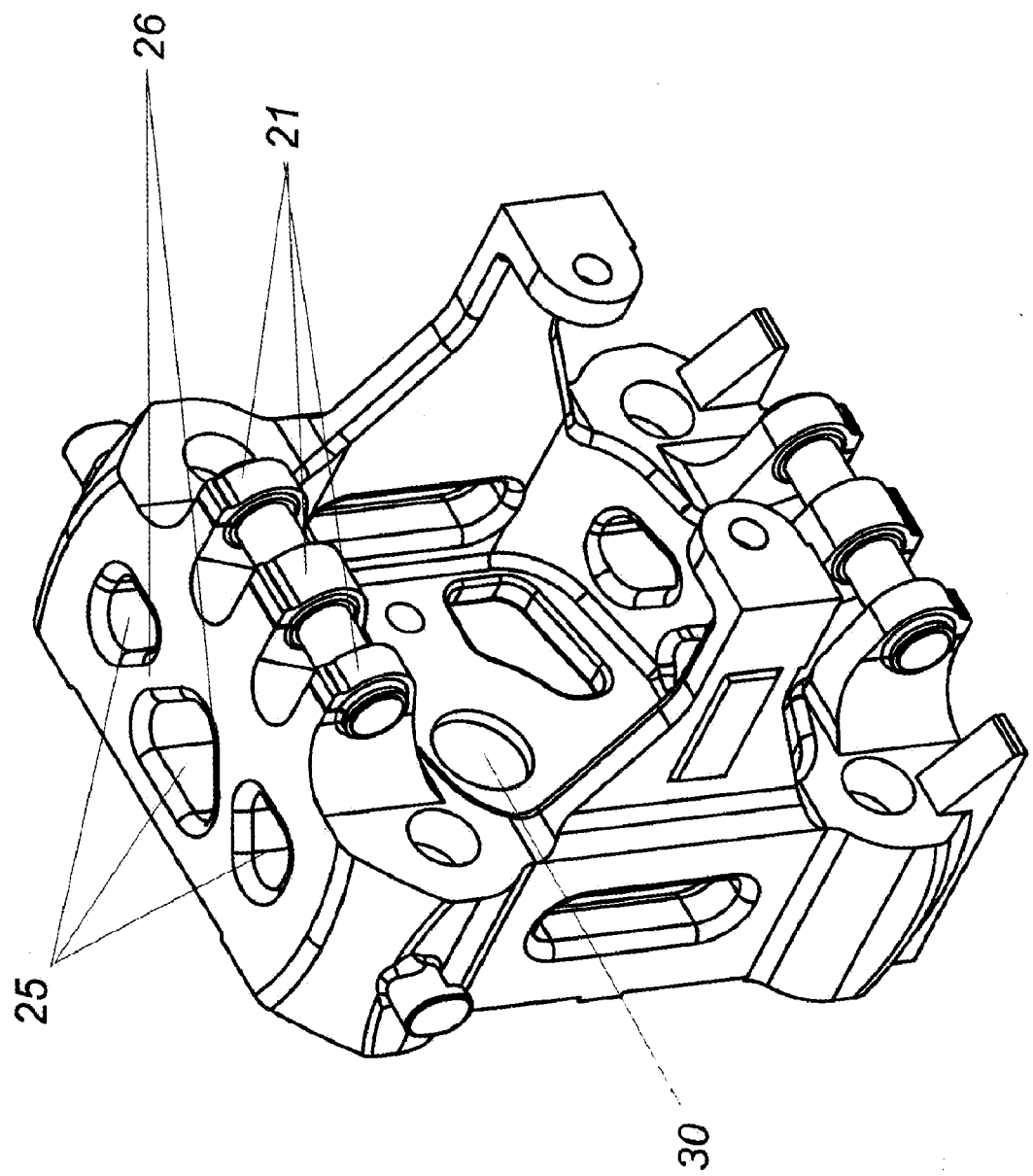

In FIG. 4 a support section 9 is illustrated on its own in perspective. The individual lugs 21, the recesses 25 as well as the front face 9A of the support section 9 can be recognized. Individual struts 26 are arranged between the front face 9A and back face 9B of the support section 9. The deformation of the support section 9 occurs almost exclusively in the region where the lugs 21 are attached to the support section 9. The corresponding drive, which operates the toggle lever mechanism, as shown in FIG. 1, is able to pass through the central recess 30. The support section 9 here is open on the top, in order to save material and facilitate production.

FIG. 5 shows a further exemplary embodiment of a support section 9. The left illustration would be a view from above in relation to FIG. 1. FIG. 6 is the right illustration which corresponds to a section along line A-A of FIG. 5. The recesses 25 underneath the lugs 21 here are not through holes, but correspond rather to pocket or blind holes, which extend from the center of the support section 9 towards the outer edge (with the open region towards the center of the support section 9).

Contrary to normal practice, with the approach according to the invention, a local force deflection system is used superimposed on the global load-induced bowing with the aim of minimizing the relative displacements of the lever bearing points. This is achieved by an as far as possible truss-type force deflection structure, which in addition to physical separation of the front and rear faces of the support section is also characterized by the creation of cavities or through holes, in particular triangular or trapezoidal ones, for example open through holes, between these parts and by selecting the point of bracing, where the force is introduced into the compression rod-type rear support structure region. The point where the force is introduced is selected in such a way that it does not coincide with a place where pins are mounted.

If the support section 9 is fitted with three lever bushes or lugs 21, in previous versions the central bush experiences the most deformation $D_2$, when clamping force is applied; with a support section 9 fitted with four bushes 21, it is the two central bushes 21.

In the present implementation its bowing under load is kept to a minimum due to the fact that the central lug(s) 21, provided in the front part, are supported towards the rear by two struts 26 running diagonally outwards to the points where the force is introduced (bearing surfaces of the spar nuts). Thus a direct flow of force from the central lug(s) 21, loaded the most towards the rear points where the force is introduced, should be achieved. In return the two outer lugs 21, which in the conventional case experience considerably less deformation $D_1$ are not supported to the rear directly towards the points where the force is introduced, but rather by the two triangular recesses 25 arranged behind these lugs 21. The ideal shape of the recess(es) can be determined from: the forces which occur on the support section (dependent on the clamping force); the dimensions of the support section; and the material(s) from which the support section is made. The deformations predicted in this way from the forces, levers and material characteristics can therefore be determined, which in turn allows the necessary dimensions and shapes of the recess (es) and optional struts to be determined.

The invention claimed is:

1. Mold clamping mechanism of an injection molding machine with a movable platen, a fixed platen and a support section connected to the movable platen through connecting links, said support section having a front face and a back face and wherein, when clamping force is applied via the connecting links, a force is directed in a force direction to the front face of the support section, wherein at least one recess is arranged between the front face and the back face of the support section, which is formed in such a manner that those regions of the front face of the support section to which the force is transferred are evenly deformed when force is applied, and wherein the connecting links are connected to the support section by articulated joints and lugs arranged on the support section, so that the force is transmitted to the support section by the lugs.

2. Mold clamping mechanism according to claim 1, wherein said lugs comprise outer lugs and at least one central lug, and wherein said at least one recess is only arranged in the region of the at least one central lug.

3. Mold clamping mechanism according to claim 1, wherein one of said lugs is a central lug and the at least one recess is in the region of the central lug.

4. Mold clamping mechanism according to claim 1, wherein, in a force deformable region of the front face of the support section, struts are additionally arranged between the front face and back face of the support section in the region of the at least one recess.

5. Mold clamping mechanism according to claim 4, wherein the struts are at an angle to the force direction that is other than 0°.

6. Mold clamping mechanism according to claim 4, wherein the struts are at an angle to the force direction of 35°-55°.

7. Mold clamping mechanism according to claim 4, wherein the struts are at an angle to the force direction of 45°.

8. Mold clamping mechanism according to claim 1, wherein the at least one recess at least partly has a triangular cross section.

9. Mold clamping mechanism according to claim 1, wherein the at least one recess at least partly has an approximately trapezoidal cross section.

10. Mold clamping mechanism according to claim 1, wherein the connecting links comprise a toggle lever mechanism.

11. Support section of a mold clamping mechanism, said support section having a front face and a back face and wherein at least one recess is arranged between the front face and the back face of the support section so that when a force is directed to the front face, the front face is evenly deformed and wherein lugs are arranged on the support section so that the force is transmitted to the support section by the lug.

12. Mold clamping mechanism of an injection molding machine with a movable platen, a fixed platen and a support section connected to the movable platen through connecting links, said support section having a front face and a back face and wherein, when clamping force is applied via the connecting links, a force is directed in a force direction to the front face of the support section, wherein in each area of the support section where a lug and an articulated joint are located there are a plurality of spaced recesses arranged between the front face and the back face of the support section, so that those regions of the front face of the support section to which the force is transferred are evenly deformed when force is applied.

13. Mold clamping mechanism according to claim 12, wherein the connecting links are connected to the support section by the articulated joint and the lug arranged on the support section, so that the force is transmitted to the support section by the lug.

14. Mold clamping mechanism according to claim 12, wherein said lug is a central lug, the mold clamping mechanism including outer lugs and wherein said recesses are only arranged in the region of the central lug.

15. Mold clamping mechanism according to claim 12, wherein said lug is a central lug and the mold clamping mechanism includes outer lugs, the plurality of recesses including a recess in the region of each lug, the recess that is in the region of the central lug being larger than each recess that is in the region of each of the outer lugs.

16. Mold clamping mechanism according to claim 12, wherein struts are included between the plurality of recesses.

17. Mold clamping mechanism according to claim 16, wherein the struts are at an angle to the force direction that is other than 0°.

18. Mold clamping mechanism according to claim 16, wherein the struts are at an angle to the force direction of 35°-55°.

19. Mold clamping mechanism according to claim 16, wherein the struts are at an angle to the force direction of 45°.

20. Mold clamping mechanism according to claim 12, wherein the recesses at least partly have a triangular cross section.

21. Mold clamping mechanism according to claim 12, wherein the recesses at least partly have an approximately trapezoidal cross section.

22. Mold clamping mechanism according to claim 12, wherein the connecting links comprise a toggle lever mechanism.

23. Support section of a mold clamping mechanism, said support section having a front face and a back face and wherein in each area of the support section where a lug and an articulated joint are located there are a plurality of spaced recesses arranged between the front face and the back face of the support section so that when a force is transferred to the front face, the front face is evenly deformed and wherein the lug is arranged on the support section so that the force is transmitted to the support section by the lug.

24. Mold clamping mechanism of an injection molding machine, comprising a movable platen, a fixed platen, a support section having a front face, a back face and at least one recess arranged between the front face and the back face, at least three connecting links which connect the movable platen with the support section, wherein at least one inner lug and two outer lugs of the connecting links are connected on at least three connection regions to the front face of the support section, and wherein, when clamping force is applied along a direction of force via the connecting links, a force is transmitted to the front face of the support section, which deforms the front face and the back face, and wherein the at least one recess is formed in such a manner that those connection regions of the front face of the support section to which the force is transferred and to which the at least three lugs are connected cause even deformation in the front face when force is transmitted thereto via the lugs.

* * * * *